United States Patent
Classen et al.

(10) Patent No.: US 8,402,826 B2
(45) Date of Patent: Mar. 26, 2013

(54) MICROMECHANICAL Z-SENSOR

(75) Inventors: Johannes Classen, Reutlingen (DE); Lars Tebje, Reutlingen (DE)

(73) Assignee: Robert Bosch GmbH, Stuttgart (DE)

( * ) Notice: Subject to any disclaimer, the term of this patent is extended or adjusted under 35 U.S.C. 154(b) by 414 days.

(21) Appl. No.: 12/304,603

(22) PCT Filed: Oct. 15, 2007

(86) PCT No.: PCT/EP2007/060961
§ 371 (c)(1),
(2), (4) Date: May 19, 2009

(87) PCT Pub. No.: WO2008/071479
PCT Pub. Date: Jun. 19, 2008

(65) Prior Publication Data
US 2010/0024553 A1  Feb. 4, 2010

(30) Foreign Application Priority Data
Dec. 12, 2006  (DE) .......................... 10 2006 058 747

(51) Int. Cl.
*G01P 15/125* (2006.01)
(52) U.S. Cl. .................................................. 73/514.32
(58) Field of Classification Search ............... 73/514.32, 73/514.29, 514.36, 514.38
See application file for complete search history.

(56) References Cited

U.S. PATENT DOCUMENTS

| | | | |
|---|---|---|---|
| 5,350,189 A * | 9/1994 | Tsuchitani et al. | 280/735 |
| 5,488,864 A * | 2/1996 | Stephan | 73/514.32 |
| 5,905,203 A | 5/1999 | Flach et al. | |
| 6,634,232 B1 * | 10/2003 | Rettig et al. | 73/514.15 |
| 7,022,543 B2 * | 4/2006 | Eskridge et al. | 438/52 |
| 7,121,141 B2 * | 10/2006 | McNeil | 73/514.32 |
| 7,140,250 B2 * | 11/2006 | Leonardson et al. | 73/504.14 |
| 7,178,400 B2 * | 2/2007 | Murata et al. | 73/514.29 |
| 7,210,352 B2 * | 5/2007 | Foster et al. | 73/514.32 |
| 7,426,863 B2 * | 9/2008 | Kuisma | 73/514.32 |
| 7,578,190 B2 * | 8/2009 | Lin et al. | 73/514.29 |
| 2004/0129077 A1 | 7/2004 | Franz et al. | |
| 2010/0122578 A1 * | 5/2010 | Classen | 73/514.32 |

FOREIGN PATENT DOCUMENTS

| | | |
|---|---|---|
| EP | 0 244 581 | 11/1987 |
| EP | 0 773 443 | 5/1997 |
| JP | 5-26903 | 2/1993 |
| JP | 2000-24965 | 1/2000 |
| JP | 2001-330442 | 11/2001 |
| JP | 2003-519384 | 6/2003 |
| JP | 2004-510377 | 4/2004 |
| JP | 2004-531714 | 10/2004 |
| JP | 2006-153482 | 6/2006 |
| WO | WO 02/082096 | 10/2002 |

OTHER PUBLICATIONS

International Search Report, PCT/EP2007/060961 dated Jun. 10, 2008.

* cited by examiner

*Primary Examiner* — Helen C. Kwok
(74) *Attorney, Agent, or Firm* — Kenyon & Kenyon LLP

(57) ABSTRACT

A micromechanical z-sensor includes a sensitivity, a torsion spring, and a seismic additional mass, the torsion spring having a spring width, and the seismic additional mass including webs having a web width. The web width is selected smaller than the spring width.

4 Claims, 1 Drawing Sheet

MICROMECHANICAL Z-SENSOR

FIELD OF THE INVENTION

The present invention is based on a micromechanical z-sensor having a sensitivity, a torsion spring, and an additional seismic mass, the torsion spring having a spring width, and the additional seismic mass having webs having a web width.

BACKGROUND INFORMATION

Capacitive acceleration sensors with a detection direction perpendicular to the wafer plane, referred to as z-sensors, often utilize balancing-rocker constructions. The sensor principle of these balancing rockers is based on a spring-mass system in which a movable seismic mass forms a plate-type capacitor together with two counter electrodes disposed on the substrate. The seismic mass is connected to the base via a torsion spring. If the mass structures on the two sides of the torsion spring are of different size, then an acceleration action will induce the mass structure to rotate relative to the torsion spring as axis of rotation. Such a mass difference is caused by, for example, an additional mass affixed asymmetrically to the torsion spring. The distance of the electrodes on the side having the larger mass therefore becomes smaller and greater on the other side. The resulting change in capacitance is a measure for the acting acceleration. The sensor principle of these balancing rockers is described in the EP 0 244 581 or EP 0 773 443.

A central element of this sensor type is its torsion spring. The torsion spring is determinative of the mechanical sensitivity of the sensor. Variations in the production process result in fluctuations in the width of the torsion springs, which greatly influence the sensitivity. In conventional balancing-rocker structures, these fluctuations in sensitivity are not compensated.

SUMMARY

Example embodiments of the present invention provide a mass structure on which process fluctuations during the production have a less pronounced effect on the sensitivity of the sensor.

Example embodiments of the present invention provide a micromechanical z-sensor having a sensitivity, a torsion spring and a seismic additional mass, the torsion spring having a spring width, and the seismic additional mass including webs having a web width. The web width is selected smaller than the spring width.

In example embodiments of the present invention, the web width is selected smaller than one half of the spring width and greater than one fourth of the spring width, preferably greater than one third of the spring width. It is also advantageous that the z-sensor has a mass structure, which includes additional webs having an additional web width, and that the web width and the additional web width differ from one another. It is advantageous that webs having different widths are provided and that the web width is an average width.

An aspect example embodiments of the present invention consists of the constructive implementation of the balancing-rocker structure in the region of the additional mass, suitably selected as a function of the torsion spring. The additional mass has a structure of interconnected bar elements, the structure being adapted to the width of the torsion springs. This structure results in a reduced variation range of the sensor's sensitivity, which is advantageous for the post-connected evaluation electronics, among others.

Example embodiments of the present invention may basically be utilized in any acceleration sensor designed according to the balancing-rocker principle. Example embodiments of the present invention are easy to realize and offer the potential for simplifying the required evaluation electronics or for reducing the size of the sensor chip. This may result in cost advantages or better performance of the sensors.

DETAILED DESCRIPTION

Figure 1:
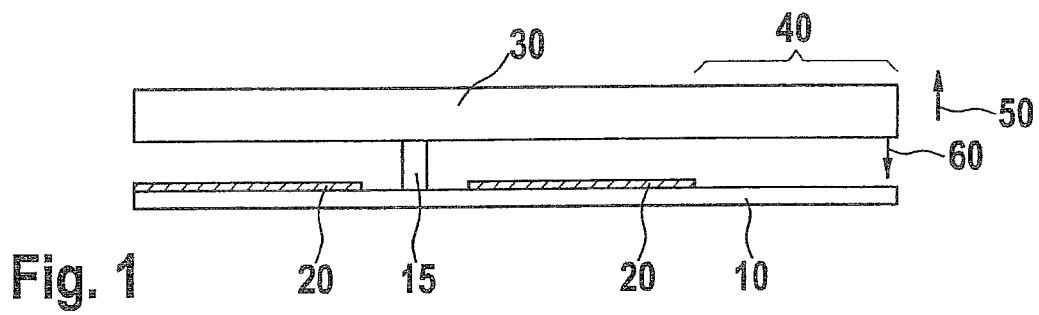
FIG. 1 shows a conventional z-sensor in a side view.

FIG. 1 shows a conventional z-sensor in a side view. It is merely a schematic illustration. Illustrated is a surface-micromechanical sensor having a substrate 10, which has a main surface in one plane (x; y). A mass structure 30 is disposed above substrate 10 at an anchoring 15. Electrodes 20 are situated on substrate 10 underneath mass structure 30. Mass structure 30 has an additional mass 40, which is disposed asymmetrically with respect to anchoring 15. In the operating state of an accelerated movement of the z-sensor having an acceleration component 50 perpendicular to the plane (x; y), mass structure 30 having additional mass 40 is deflected in relation to sensor substrate 10, in z-direction 60.

Figure 2:
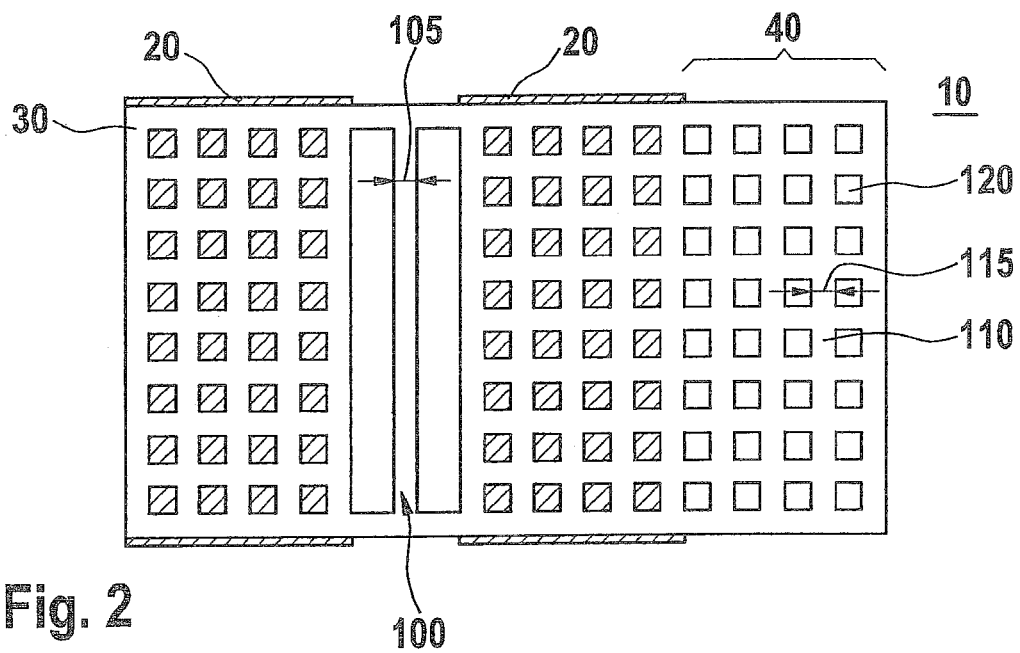
FIG. 2 shows the conventional z-sensor in a plan view.

FIG. 2 shows a conventional z-sensor in a plan view. Mass structure 30 includes a torsion spring 100 having a spring width 105. Via anchoring 15 disposed underneath, the torsion spring is connected to substrate 10. The sensitivity of this type of sensor depends to a large degree upon the rigidity of torsion spring 100 and the mass distribution within the balancing-rocker structure. High sensitivity is produced by a "soft" torsion spring 100 and/or a large additional mass 30. For technological reasons, the movable balancing-rocker structure is provided with holes 120 (perforated). For the following comments it is helpful to imagine the structure made up of individual webs 110 in the assembled state. The variations in the production process mentioned in the related art not only affect torsion spring 100 but also the perforated balancing-rocker structure. Each web 110 basically is subject to the same fluctuations as torsion spring 100, which means that a reduction in spring width 105 is accompanied by a reduced web width 115, and vice versa. Spring width 105 is entered in sensitivity E (deflection divided by acceleration) of the sensor at the third power, while additional mass 40, which is a function of web width 115, is entered linearly:

$$E \propto \frac{m_{Zusatzmasse}}{b_{Feder}^3}. \qquad (\text{eq. 1}).$$

If torsion spring 100 and webs 110 of additional mass 40 are then affected by the same absolute width fluctuation $\Delta b$, the following is approximately valid for the additional mass affected by the process fluctuations $$m_{Zusatzmasse,Prozess} \propto b_{Massesteg}\left(1 + \frac{\Delta b}{b_{Massesteg}}\right), \quad \text{(eq. 2)},$$

and for the fluctuating spring width $$b^3_{Feder,Prozess} \approx b^3_{Feder}\left(1 + \frac{\Delta b}{b_{Feder}}\right)^3 \approx b^3_{Feder}\left(1 + 3\frac{\Delta b}{b_{Feder}}\right). \quad \text{(eq. 3)}.$$

After cycling through the production process, the following therefore results for the sensitivity $$E_{Prozess} \propto \frac{b_{Massesteg}\left(1 + \frac{\Delta b}{b_{Massesteg}}\right)}{b^3_{Feder}\left(1 + 3\frac{\Delta b}{b_{Feder}}\right)}. \quad \text{(eq. 4)}.$$

A compensation of the process fluctuations takes place for:

$$b_{Massesteg} \approx \frac{b_{Feder}}{3}, \quad \text{(eq. 5)},$$

i.e., if mass web width 115 corresponds to one third of spring width 105, then the expressions in parenthesis are canceled, and the sensitivity in the first order becomes independent of fluctuations Δb of the structure width.

For a sensitivity compensation with regard to parameter Δb, the mass structure must therefore be adapted to width 105 of torsion spring 100 according to equation 5. A corresponding structure is shown in FIG. 3.

Figure 3:
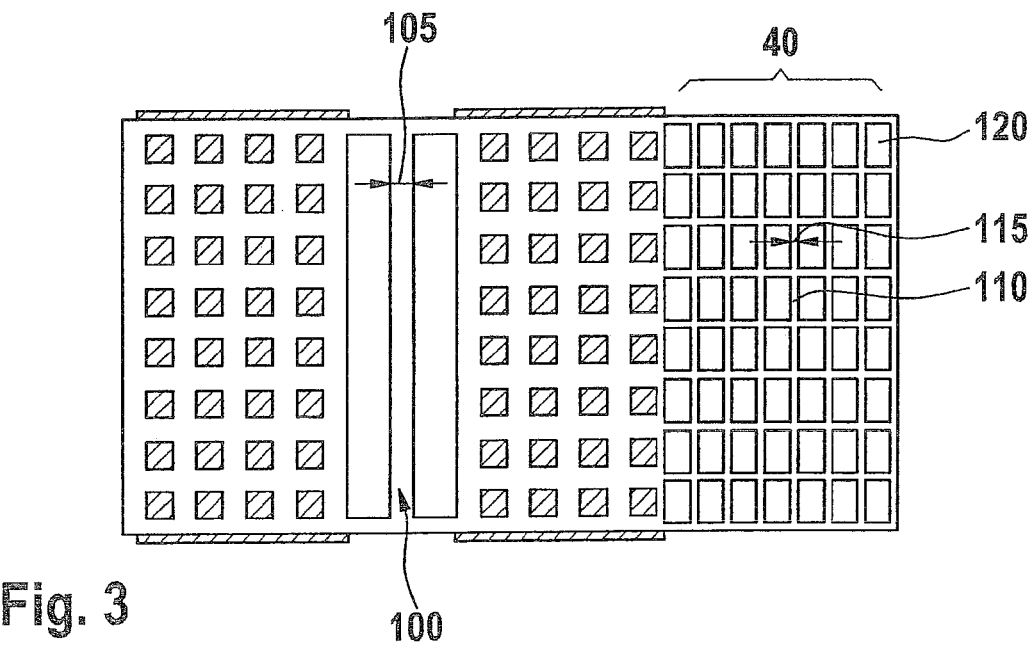
FIG. 3 shows a z-sensor according to an example embodiment of the present invention in a plan view.

FIG. 3 shows a z-sensor according to an example embodiment of the present invention in a plan view. According to example embodiments of the present invention, web width 115 for webs 110 in the region of additional mass 40 amounts to one third of spring width 105 of torsion spring 100. If it is impossible for technological reasons to select a sufficiently small mass web, then a value that comes as close as possible to equation 5 must be chosen for the web width. In comparison with disregarding equation 5, the resulting compensation is not complete but improved.

The remaining mass structure 30 of the balancing rocker may have perforations as desired, also identical with additional mass 40.

What is claimed is:

1. A micromechanical z-sensor, comprising:
   a torsion spring; and
   an additional seismic mass;
   wherein the torsion spring has a spring width, the additional seismic mass including webs having a web width; and
   wherein the web width is smaller than one half of the spring width and greater than one quarter of the spring width.

2. The micromechanical z-sensor according to claim 1, wherein the web width is one third of the spring width.

3. The micromechanical z-sensor according to claim 1, further comprising a mass structure including additional webs having an additional web width, the web width and the additional web width differing from one another.

4. The micromechanical z-sensor according to claim 1, wherein the webs having a different width are provided, the web width being an average width.

\* \* \* \* \*

UNITED STATES PATENT AND TRADEMARK OFFICE
CERTIFICATE OF CORRECTION

PATENT NO.        : 8,402,826 B2                                                   Page 1 of 1
APPLICATION NO. : 12/304603
DATED             : March 26, 2013
INVENTOR(S)       : Classen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 523 days.

Signed and Sealed this

First Day of September, 2015

Michelle K. Lee
*Director of the United States Patent and Trademark Office*